(12) United States Patent
Anagnos et al.

(10) Patent No.: US 9,377,110 B2
(45) Date of Patent: Jun. 28, 2016

(54) FLUID CONTROL VALVE HAVING AN ADJUSTABLE VALVE STEM AND PISTON ASSEMBLY

(71) Applicant: Fisher Controls International LLC, Marshalltown, IA (US)

(72) Inventors: Richard James Anagnos, Conrad, IA (US); Paul A. Day, Marshalltown, IA (US); Ernest Souliere, Rochester, NH (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 499 days.

(21) Appl. No.: 13/627,736

(22) Filed: Sep. 26, 2012

(65) Prior Publication Data

US 2014/0084200 A1     Mar. 27, 2014

(51) Int. Cl.
*F16K 31/524* (2006.01)
*F16K 1/02* (2006.01)
*F16K 31/50* (2006.01)

(52) U.S. Cl.
CPC . *F16K 1/02* (2013.01); *F16K 31/50* (2013.01); *F16K 31/524* (2013.01)

(58) Field of Classification Search
USPC ......... 251/257, 258, 259, 260, 261, 265, 252; 137/315.39
See application file for complete search history.

(56) References Cited

U.S. PATENT DOCUMENTS

| | | | | |
|---|---|---|---|---|
| 3,543,777 A | * | 12/1970 | Howes | 137/551 |
| 3,757,612 A | * | 9/1973 | Schaefer | 477/156 |
| 4,177,971 A | * | 12/1979 | Landamore | 251/215 |
| 4,343,456 A | * | 8/1982 | Zitzloff | 251/255 |
| 4,488,704 A | * | 12/1984 | Wicker | 251/265 |
| 4,509,721 A | * | 4/1985 | Lassally | 251/335.3 |
| 4,549,719 A | | 10/1985 | Baumann | |
| 4,609,178 A | * | 9/1986 | Baumann | 251/229 |
| 4,905,730 A | * | 3/1990 | Stoll | 137/543.21 |
| 5,002,086 A | * | 3/1991 | Linder | F16K 17/0453 137/312 |

(Continued)

FOREIGN PATENT DOCUMENTS

| | | |
|---|---|---|
| EP | 1426626 | 6/2004 |
| EP | 1752694 | 2/2007 |

OTHER PUBLICATIONS

Emerson Process Management, "Baumann 83000 Sanitary Angle Control Valve," Product Bulletin, Oct. 2010, 8 pages.

(Continued)

*Primary Examiner* — Kevin Murphy
*Assistant Examiner* — Jonathan Waddy
(74) *Attorney, Agent, or Firm* — Hanley, Flight & Zimmerman, LLC (57) ABSTRACT

Fluid control valves having an adjustable valve stem and piston assembly are described herein. An example fluid control valve includes a piston to control a flow of fluid through a valve body, a bonnet having a threaded bore and a housing to be removably disposed within and threadably coupled to the bonnet. The housing includes a first portion to be disposed in the bonnet, a roller assembly to be pivotally mounted to the first portion, the roller assembly to engage the piston to control a position of the piston. The housing including a second portion with a threaded outer surface to couple to the threaded bore of the bonnet. A valve stem is to move through the housing to control the movement of the roller assembly and the piston.

27 Claims, 6 Drawing Sheets

(56) References Cited

U.S. PATENT DOCUMENTS

| | | | | |
|---|---|---|---|---|
| 5,103,857 A | * | 4/1992 | Kuhn et al. | 137/315.13 |
| 5,215,286 A | * | 6/1993 | Kolenc | F16K 7/12 |
| | | | | 251/214 |
| 5,906,353 A | * | 5/1999 | Someya et al. | 251/58 |
| 6,138,712 A | * | 10/2000 | Hirose | 137/559 |
| 6,186,477 B1 | * | 2/2001 | McCombs et al. | 251/323 |
| 6,308,730 B1 | * | 10/2001 | Schulze | F16K 17/30 |
| | | | | 137/459 |
| 6,802,492 B2 | * | 10/2004 | Payne | F16L 55/07 |
| | | | | 251/149.9 |
| 6,805,158 B2 | * | 10/2004 | Ejiri | 137/557 |
| 6,997,209 B2 | * | 2/2006 | Ejiri | F15B 15/261 |
| | | | | 137/383 |
| 7,677,528 B2 | * | 3/2010 | Shinohara | F16K 31/1262 |
| | | | | 251/58 |
| 2001/0025657 A1 | | 10/2001 | Ejiri | |
| 2006/0091345 A1 | * | 5/2006 | Jordan | F16F 9/461 |
| | | | | 251/251 |
| 2009/0114873 A1 | * | 5/2009 | Anagnos et al. | 251/331 |

OTHER PUBLICATIONS

Emerson Process Management, "Baumann 83000 Sanitary Angle Control Valve," Instruction Manual, Dec. 2014, 12 pages.

Patent Cooperation Treaty, "International Preliminary Report on Patentability", issued in connection with PCT Application No. PCT/US2013/061523, mailed on Mar. 31, 2015, 6 pages.

Patent Cooperation Treaty, "Written Opinion", issued in connection with PCT Application No. PCT/US20131061523, mailed on Jan. 8, 2014, 5 pages.

Patent Cooperation Treaty, "International Search Report", issued in connection with PCT Application No. PCT/US2013/061523, mailed on Jan. 8, 2014, 4 pages.

* cited by examiner

FLUID CONTROL VALVE HAVING AN ADJUSTABLE VALVE STEM AND PISTON ASSEMBLY

FIELD OF THE DISCLOSURE

The present disclosure relates generally to fluid valves and, more particularly, to a fluid control valve having an adjustable valve stem and piston assembly.

BACKGROUND

Process control systems often employ fluid control valves to control a flow of fluid. In some low-flow sanitary fluid valves, a valve stem moves within a bonnet that houses a roller assembly. In operation, an actuator moves the valve stem through the bonnet, which causes the roller assembly to move a plate attached to a piston that moves a fluid control member (e.g., a membrane or diaphragm) relative to an orifice or valve seat to control fluid flow.

In such low-flow applications, the movements of the piston are relatively small and, thus, such valves must be calibrated accurately to tightly control the relationship between the movement of the valve stem and the movement of the piston. In many such known valves, this calibration is performed at the time of manufacture (e.g., in a factory setting) by holding the valve stem, the plate and the piston at fixed positions relative to the bonnet (e.g., such that the valve is in a closed position) and then affixing the piston to the plate (e.g., gluing with adhesive). As a result, any recalibration to these known valves typically requires disassembly and/or rebuilding of the valves (e.g., in a manufacturing environment).

SUMMARY

An example fluid control valve includes a piston to control flow of fluid through a valve body, a bonnet having a threaded bore and a housing to be removably disposed within and threadably coupled to the bonnet. The housing includes a first portion to be disposed in the bonnet, a roller assembly to be pivotally mounted to the first portion, the roller assembly to engage the piston to control a position of the piston. The housing including a second portion with a threaded outer surface to couple to the threaded bore of the bonnet. A valve stem is to move through the housing to control the movement of the roller assembly and the piston.

In another example, a fluid control valve includes a bonnet and a housing. A valve stem moves through the housing to control a piston. The housing couples to the bonnet and can be adjusted to calibrate the valve.

DETAILED DESCRIPTION

In general, the example fluid control valve described herein provides self-alignment of its internal components during manufacture of the valve, the ability to perform field adjustments to calibrate the valve and the ability to select different fluid flow characteristics. More specifically, the example valve includes a unitary piece that functions as a housing through which the valve stem moves and a mount for a roller assembly that moves a piston within the valve. The housing has a threaded outer surface that couples to a threaded bore in the bonnet. The threaded coupling between the housing and the bonnet ensures that the valve stem remains aligned with the roller assembly and also enables the housing to be field-adjusted to calibrate the valve (e.g. by rotating the housing relative to the bonnet). The example valve also provides an externally accessible screw that can be used to more precisely calibrate the valve. In addition, the housing contains a pin that stops the movement of the valve stem at a predetermined position (e.g., such that the valve is closed), thereby ensuring that the movement of the valve stem from a closed position always starts at the same point. This permits the use of valve stems having different shapes and flow profiles, such as an equal percentage profile.

Figure 1:
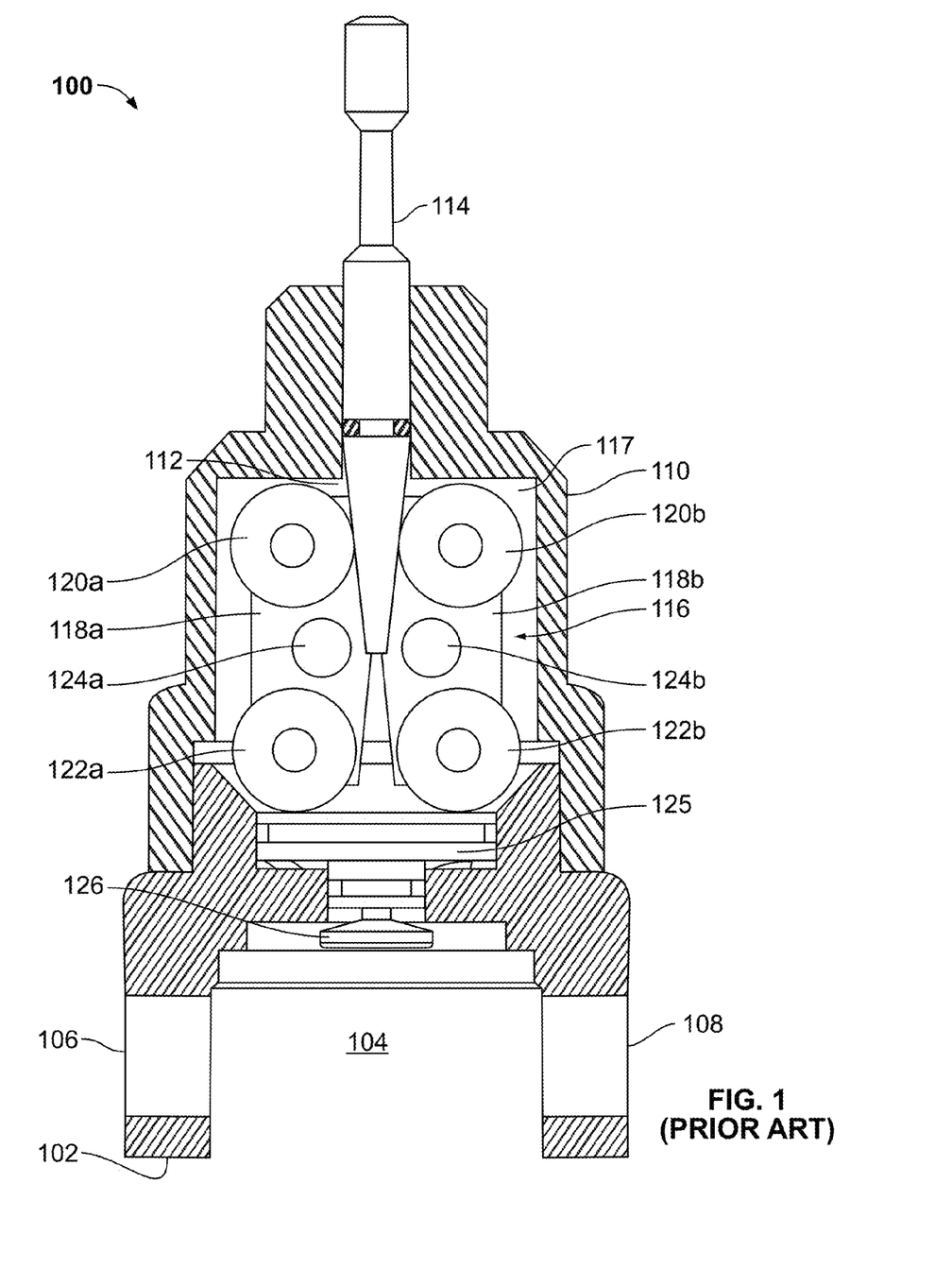
FIG. 1 illustrates a known fluid control valve.

Before discussing an example fluid control valve in detail, a brief description of a known fluid control valve 100 is provided in connection with FIG. 1. The known fluid valve 100 includes a bonnet yoke 102 that defines a cavity 104 into which a valve body (not shown) is placed. Openings 106 and 108 in the bonnet yoke 102 receive bolts (not shown) to fix the valve body in the cavity 104. A bonnet 110 couples the bonnet yoke 102 to an actuator (not shown) and includes an opening 112 to slidably receive a valve stem 114, which operatively couples the actuator to a flow control member (not shown) disposed within the valve body. The fluid valve 100 also includes a roller assembly 116 disposed within a cavity 117 of the bonnet 110. The roller assembly 116 includes first and second arms 118a and 118b, first and second upper rollers 120a and 120b, first and second lower rollers 122a and 122b and first and second pivots 124a and 124b.

In operation, an actuator moves the valve stem 114 toward the roller assembly 116 to rotate the upper rollers 120a and 120b, which causes the first and second arms 118a and 118b to rotate about the first and second pivots 124a and 124b. This rotation of the arms 118a and 118b causes the lower rollers 122a and 122b to rotate and move plate 125 and a piston 126 toward the valve body (i.e., downward in the orientation of FIG. 1) to cause a flow control member to restrict the flow of fluid through valve body. When the valve stem 114 is moved far enough, the piston 126 moves the flow control member to a closed position to prevent any fluid flow through the valve body. An actuator moves the valve stem 114 away from the roller assembly 116 to rotate the upper rollers 120a and 120b in the opposite direction, which causes the first and second arms 118a and 118b to rotate about the first and second pivots 124a and 124b. This rotation of the arms 118a and 118b causes the lower rollers 122a and 122b to rotate and move the plate 125 and the piston 126 away from the valve body (i.e., upward in the orientation of FIG. 1) to cause the flow control member to increase the flow of fluid through the valve body.

In low-flow applications, the amount of fluid that flows through the valve body is relatively small. As such, the movements of the piston 126 and the flow control member are also small. Typically, there is a fixed relationship between the movement of the valve stem 114 and the movement of the piston 126, and the fluid valve 100 must be calibrated accurately to ensure that this relationship remains in effect. This calibration is typically performed at the time of manufacture by holding the valve stem 114, the plate 125 and the piston 126 in fixed positions such that the valve 100 is in a closed position. The piston 126 is then affixed to the plate 125 (e.g.

glued with adhesive). If there is an error during manufacture or if the relationship between the movement of the valve stem 114 and the movement of the piston 126 changes after manufacture, the fluid valve 100 can only be re-calibrated by disassembly and replacement of parts. Also, to ensure the proper operation of the fluid valve 100, the valve stem 114 must be centered relative to the roller assembly 116. This alignment is performed at the time of manufacture and cannot be easily changed thereafter.

Figure 2:
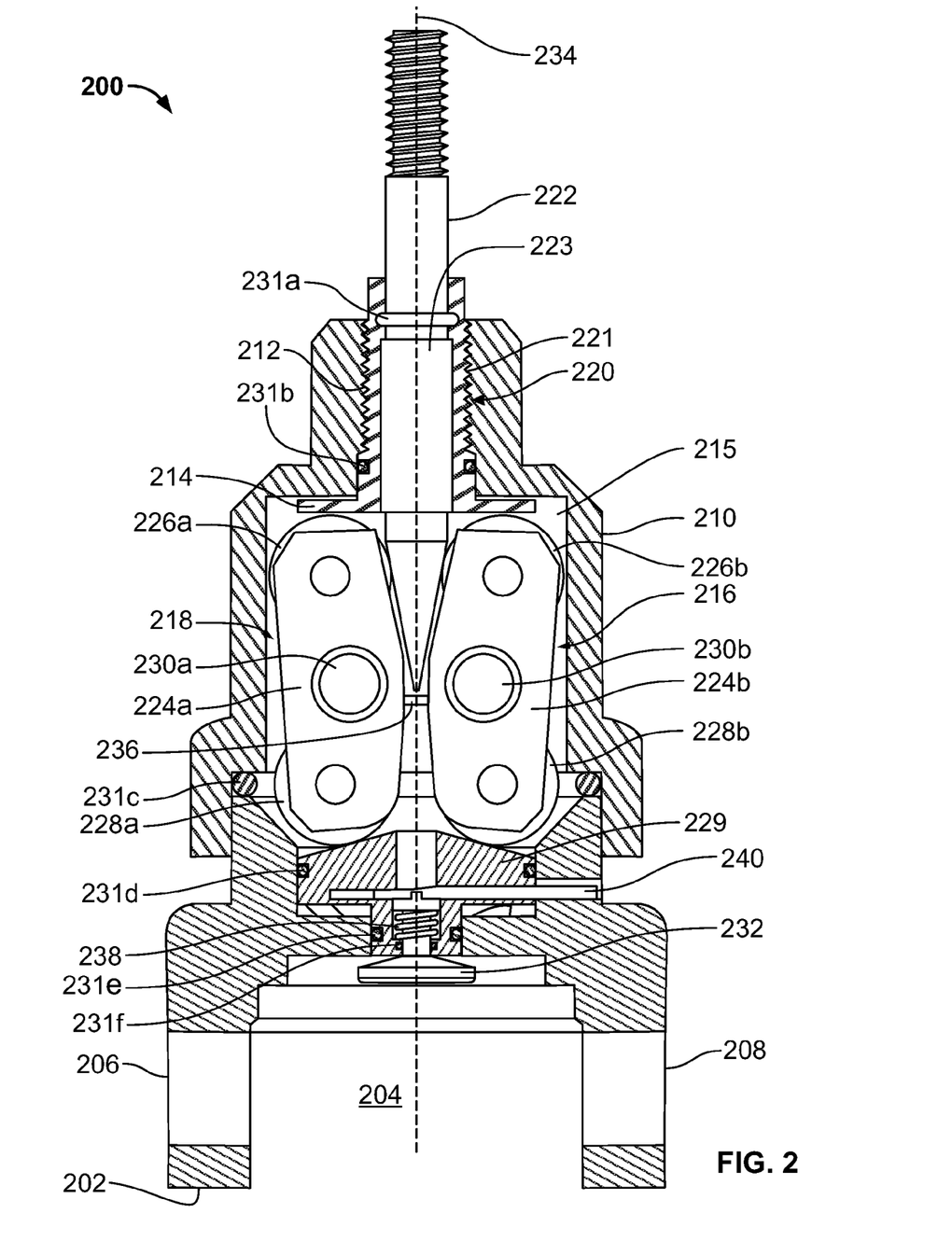
FIG. 2 illustrates an example fluid control valve described herein.

FIG. 2 illustrates an example fluid control valve 200 described herein. The example fluid valve 200 includes a bonnet yoke 202 that defines a cavity 204 into which a valve body (not shown) is placed. Openings 206 and 208 in the bonnet yoke 202 receive bolts (not shown) to fix the valve body in the cavity 204. A bonnet 210 couples the valve body to an actuator (not shown) and includes a threaded bore 212. A housing 214 disposed within a cavity 215 of the bonnet 210 has a first portion 216, on which a roller assembly 218 is mounted, and an elongated second portion 220, which has a threaded outer surface 221 that couples to the threaded bore 212. The first portion 216 of the housing 214 and the second portion 220 of the housing 214 are depicted as being part of a unitary piece. However, if desired, the housing 214 may be composed of multiple pieces. A valve stem 222 moves through the second portion 220 of the housing 214 to operatively couple an actuator (not shown) to a flow control member (not shown) disposed within the valve body. The second portion 220 of the housing 214 has a teflon sleeve 223 that provides a self-lubricating bearing surface for the valve stem 222 as it moves within the sleeve 223 through the housing 214. The roller assembly 218 includes first and second arms 224a and 224b, first and second upper rollers 226a and 226b, first and second lower rollers 228a and 228b and first and second pivots 230a and 230b. O-ring seals 231a, 231b, 231c, 231d, 231e and 231f are provided to prevent leakage of process fluid.

In operation, an actuator moves the valve stem 222 toward the roller assembly 218 to rotate the upper rollers 226a and 226b, which causes the first and second arms 224a and 224b to rotate about first and second pivots 230a and 230b. This rotation of the arms 224a and 224b causes the lower rollers 228a and 228b to rotate and move along a surface 229 and move a piston 232 toward the valve body (i.e., downward in the orientation of FIG. 2) to cause a flow control member to restrict the flow of fluid through the valve body. When the valve stem 222 is moved far enough, the piston 232 moves the flow control member to a closed position to prevent fluid flow through the valve body. An actuator moves the valve stem 222 away from the roller assembly 218 to rotate the upper rollers 226a and 226b in the opposite direction, which causes the first and second arms 224a and 224b to rotate about first and second pivots 230a and 230b. This rotation of the arms 224a and 224b causes the lower rollers 228a and 228b to rotate and move the piston 232 away from the valve body to cause the flow control member to increase the flow of fluid through the valve body.

The housing 214 mounts the roller assembly 218 and also receives the valve stem 222 so that the valve stem 222 and the roller assembly 218 are properly aligned along an axis 234. Furthermore, because the housing 214 couples to the bonnet 210 through threaded surfaces, the position of the housing 214 can easily be adjusted for calibration (e.g., by rotating the housing 214 relative to the bonnet 210). A relatively finer threading on the threaded surfaces may be provided to enable more precise calibration. In addition, the housing 214 contains a pin 236 that stops the movement of the valve stem 222 at a predetermined position (e.g., a closed position). The piston 232 includes a spring 238 to reduce vibrations and ensure proper functioning of the piston 232. Also, an externally accessible screw 240 can be used to adjust the position of the piston 232 for more precise calibration.

The valve 200 can be calibrated by adjusting the housing 214 and/or by adjusting the piston 232. Coarse calibrations can be made by rotating the housing 214 relative to the bonnet 210. Rotating the housing 214 clockwise causes the housing 214 and the mounted roller assembly 218 to move closer to the piston 232. Conversely, rotating the housing 214 counterclockwise causes the housing 214 and the roller assembly 218 to move away from the piston 232. Moving the housing 214 and the roller assembly 218 in either direction changes the position at which the valve stem 222 causes the valve 200 to be in a closed position.

Similarly, fine calibrations can be made by adjusting the position of the piston 232 relative to the bonnet 210. Specifically, moving (e.g., by turning) the externally accessible screw 240 further into the valve 200 causes the piston 232 to move away from the bonnet 210. Conversely, moving the screw 240 further out of the valve 200 causes the piston 232 to move toward the bonnet 210. Moving the piston 232 in either direction changes the position at which the valve stem 222 causes the valve 200 to be in a closed position.

Figure 3:
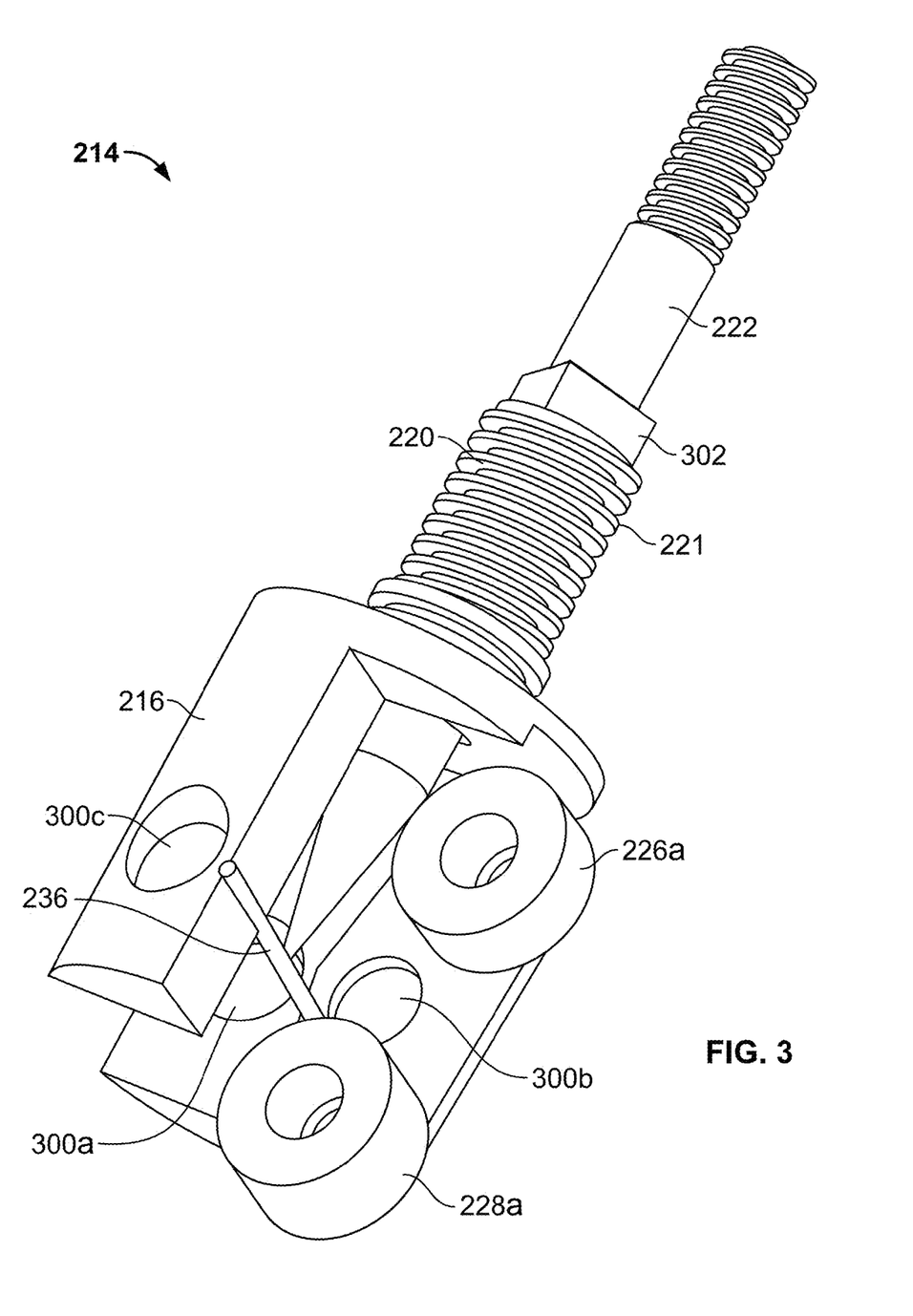
FIG. 3 illustrates the housing and the valve stem of the example valve of FIG. 2.
Figure 4:
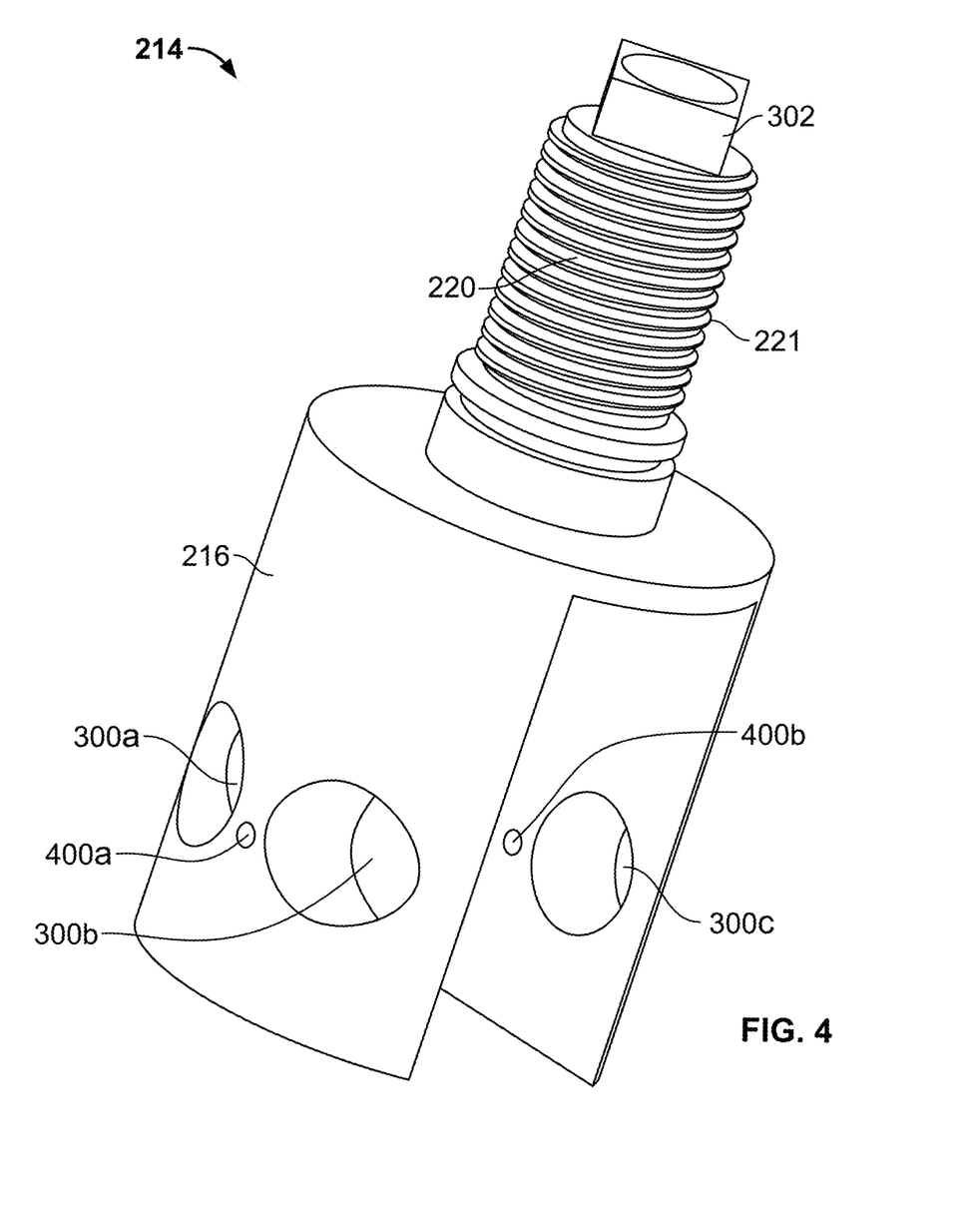
FIG. 4 is a detailed view of the housing of the example valve of FIG. 2.

FIGS. 3 and 4 illustrate a detailed view of the housing 214 of the example valve 200 of FIG. 2. The first portion of the housing 216 is generally cylindrically shaped, which allows the housing 214 to rotate within the bonnet 210. The upper rollers 226a and 226b and the lower rollers 228a and 228b are mounted on the first portion 216 of the housing 214. Openings 300a, 300b, 300c and a fourth opening (not shown) are used to mount the pivots 230a and 230b. Openings 400a and 400b are used to mount the pin 236. A bolt head 302 integrated to the housing 214 may be used to rotate the housing 214 to perform a calibration.

Figure 5:
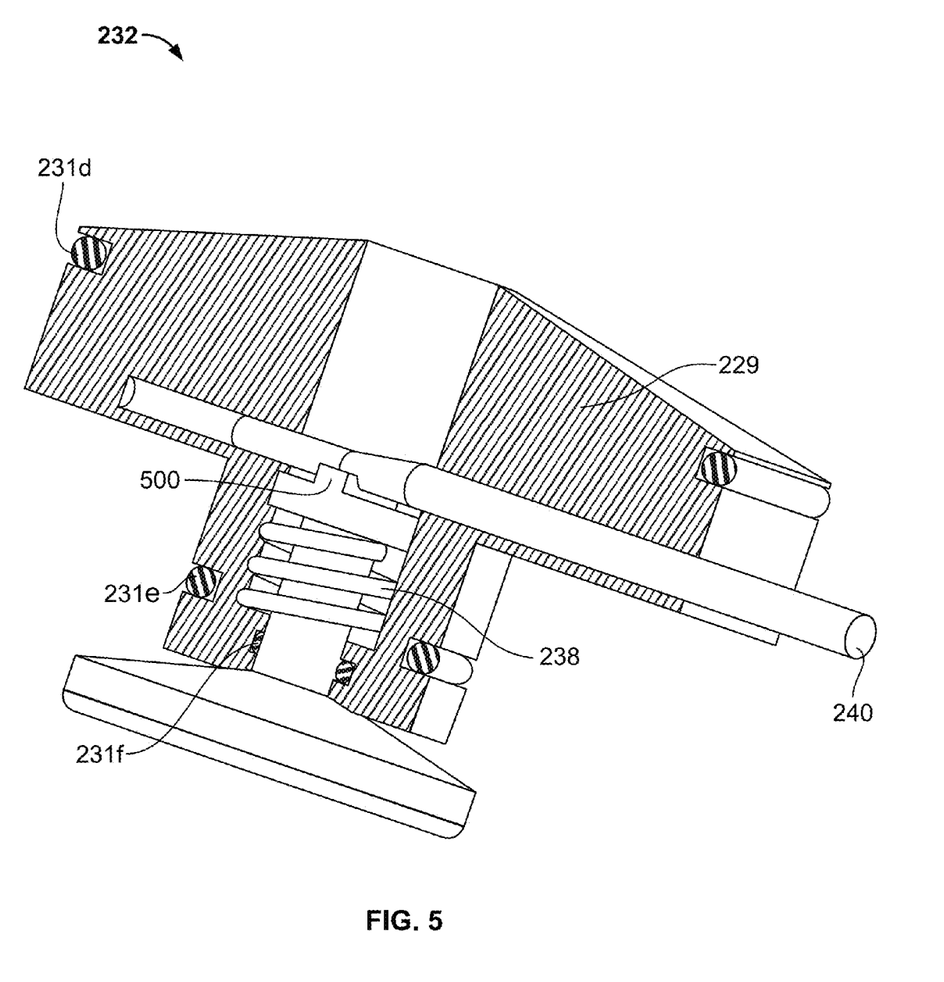
FIG. 5 is a detailed view of the piston of the example valve of FIG. 2.

FIG. 5 is a detailed view of the piston 232 of the example valve 200 of FIG. 2. The piston 232 includes protrusion or lip 500 that guides the screw 240 and prevents the piston 232 from rotating. The screw 240 is tapered such that its diameter increases further from the lip 500. Moving the screw 240 toward the lip 500 causes the piston 232 to move further from the bonnet 210. Moving the screw 240 away from the lip 500 causes the piston 232 to move closer to the bonnet.

The surface 229 in the example shown has a linear taper along which the roller assembly 218 moves. However, a different shape could be used to provide the valve assembly with a different flow profile.

Figures 6A, 6B:
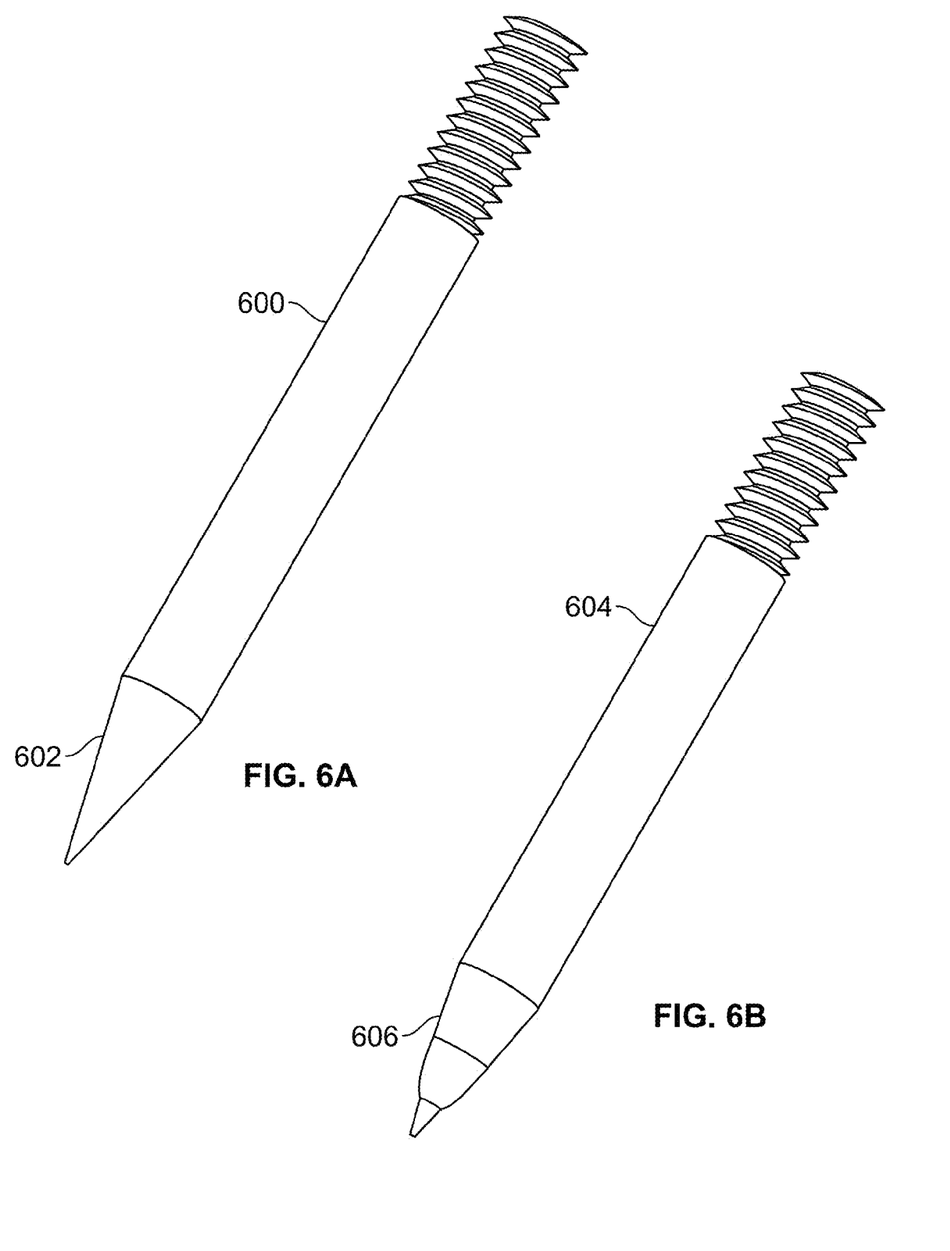
FIGS. 6A and 6B illustrate example valve stems having different flow profiles.

Alternatively or additionally, a differently shaped valve stem may be used to provide a different flow profile. FIGS. 6A and 6B illustrate example valve stems having different flow profiles. FIG. 6A depicts a valve stem 600 having a linear profile. A tip 602 of the valve stem 600 is shaped to ensure a linear profile. FIG. 6B depicts a valve stem 604 having an equal percentage profile. A tip 606 of the valve stem 604 is shaped to ensure an equal percentage profile.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An apparatus comprising:
   a bonnet;
   a housing to be removably coupled within the bonnet via a threaded portion of the housing, wherein a position of the housing relative to the bonnet is adjustable by rotating the housing relative to the bonnet to calibrate a position of a valve stem relative to a piston; and a roller assembly including rollers mounted on the housing, at least one of the valve stem or the piston is to interact with at least one of the rollers, the roller assembly is to engage the piston to move the piston in response to a movement of the valve stem to control a position of the piston.

2. The apparatus of claim 1, wherein:

the piston is to control a flow of fluid through a valve body;

the bonnet has a threaded bore; and the housing comprises:
- a first portion to which the roller assembly is pivotally mounted; and
- a second portion comprising the threaded portion to couple to the threaded bore of the bonnet.

3. The apparatus of claim 2, wherein the first and second portions of the housing comprise a unitary piece.

4. The apparatus of claim 2, wherein the first portion of the housing contains a pin to stop the movement of the valve stem at a threshold position.

5. The apparatus of claim 2, wherein the valve stem has an equal percentage profile.

6. The apparatus of claim 2, wherein the valve stem has a linear profile.

7. The apparatus of claim 2, further comprising a screw accessible from an exterior of the apparatus to adjust the position of the piston relative to the bonnet.

8. The apparatus of claim 2, wherein an interaction between the threaded portion and the threaded bore is to fix a position of the housing relative to the bonnet.

9. The apparatus of claim 2, wherein the second portion is externally accessible to enable field adjustment of the housing relative to the bonnet.

10. The apparatus of claim 2, wherein the valve stem is to interact with the roller assembly to cause a movement of the roller assembly, the movement of the roller assembly to affect the position of the piston.

11. The apparatus of claim 2, wherein the rollers of the roller assembly engage a surface of a guide coupled to the piston to affect the position of the piston.

12. The apparatus of claim 2, wherein the first portion defines a channel in which the roller assembly is to be pivotally mounted.

13. The apparatus of claim 12, wherein a pin is to extend across the channel, the pin to stop movement of the valve stem at a threshold position.

14. The apparatus of claim 2, wherein the first portion includes first opposing apertures and second opposing apertures, a first pivot extending between the first opposing apertures to pivotally mount a first arm of the roller assembly, and a second pivot extending between the second opposing apertures to pivotally mount a second arm of the roller assembly.

15. The apparatus of claim 14, wherein two of the rollers are mounted to the first arm and two of the rollers are mounted to the second arm, the first arm to be on a first side of the valve stem and the second arm to be on a second side of the valve stem to enable the valve stem to be disposed between at least one of the rollers on the first arm and at least one of the rollers on the second arm.

16. The apparatus of claim 2, further comprising a sleeve disposed within the housing, the valve stem to extend through the sleeve, the sleeve to provide a self-lubricating bearing surface for the valve stem as the valve stem moves in the sleeve.

17. The apparatus of claim 1, wherein the bonnet has a threaded bore to couple to the threaded portion of the housing.

18. The apparatus of claim 1, wherein the housing contains a pin to stop the movement of the valve stem at a threshold position.

19. The apparatus of claim 1, wherein the valve stem has an equal percentage profile.

20. The apparatus of claim 1, wherein the valve stem has a linear profile.

21. The apparatus of claim 1, further comprising an externally accessible screw to adjust a position of the piston relative to the bonnet.

22. The apparatus of claim 1, comprising:

means for pivotally mounting the roller assembly, the means for pivotally mounting the roller assembly removably coupled to the bonnet.

23. The apparatus of claim 22, further comprising means to stop the movement of the valve stem at a threshold position.

24. The apparatus of claim 22, further comprising means for establishing a fluid flow profile of the apparatus.

25. The apparatus of claim 24, wherein the means for establishing the fluid flow profile establishes an equal percentage profile.

26. The apparatus of claim 22, further comprising means for adjusting the position of the piston relative to the bonnet.

27. The apparatus of claim 1, further including a bolt head integrated into the housing to enable rotation of the housing relative to the bonnet.

* * * * *